May 9, 1961  O. FLODEN  2,983,204
ROAD ROLLER
Filed April 5, 1954
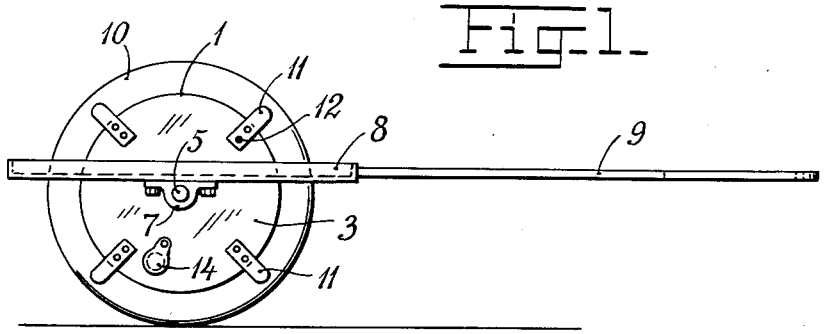
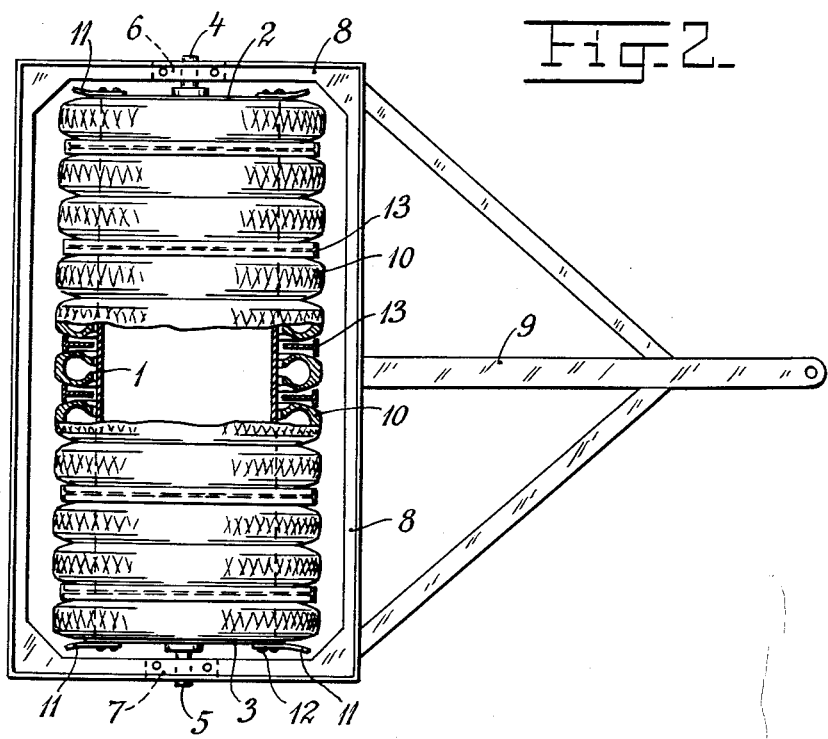
INVENTOR
Odd Floden
By Watson, Cole, Grindle & Watson
ATTORNEYS

United States Patent Office 2,983,204
Patented May 9, 1961

2,983,204

ROAD ROLLER

Odd Floden, Indset Gard, Elverum, Norway

Filed Apr. 5, 1954, Ser. No. 421,089

Claims priority, application Norway Apr. 8, 1953

2 Claims. (Cl. 94—50)

The present invention relates to a roller which may be used as an ordinary road roller, but which primarily is adapted and suited for use as a snow roller for the compacting of snow for the purpose of preparing a road track such as a wood track adapted for timber transport and the like.

It is previously suggested to build road or runway rollers with a plurality of wheels equipped with pneumatic tires side by side so as to make the rolling surface of the roller consist of a plurality of tire treads positioned adjacently to each other along the length of the roller. Such rollers are however expensive both in construction and operation as each wheel has to be a complete wheel provided with suitable bearing means or, at least, with special wheel rims supporting the pneumatic tire on a carrier member. During operation care must be taken that the air pressure of the various tires are equal and that every and all of the tires are not punctured as otherwise, in both conditions, no satisfactory operation and compacting is achieved.

It is the object of the present invention to provide a road, preferably snow roller which is of a simple construction and low production cost and also inexpensive and efficient in operation. According to the invention this is achieved by providing a rotatable supporting member with a plurality of loosely arranged pneumatic tire covers which are maintained relatively to each other by means of flange means on the supporting member and by the fact that the individual covers are contacting the covers to either side of the same.

Other features of the roller according to the invention will appear from the following description, with reference to the accompanying drawing of a preferred, but exemplified embodiment of the invention.

On the drawing, Figure 1 is a side elevational view of a roller according to the invention, and Figure 2 is a plan view of the same, certain parts being shown in horizontal section taken substantially on the horizontal centre line of Figure 1.

Referring to the drawing a road or snow roller is shown comprising a rotatable supporting member 1 in the preferred form of an elongated drum having end walls 2 and 3, but the member 1 may also be in the form of an open structure of suitable design. Further the supporting member may be of constant diameter, as shown, or of a suitably varying diameter according to the profile desired of the track to be rolled.

The end walls 2 and 3, or the equivalent members of an open structure is provided with pivots 4 and 5, respectively and the entire structure is surrounded by a framework 8, preferably made of angle iron bars and carrying bearing means 6 and 7 adapted to accommodate the said pivots 4 and 5, respectively, so as to make the member 1 freely rotatable in the frame 8. The frame 8 is also provided with a draw bar or the like 9 adapted to be connected to the draw hook or the like of a tractor, a pair of horses shafts or even a manual draw bar.

Loosely fitted on to the supporting member 1 is a plurality of pneumatic tire covers 10 which are arranged side by side and maintained in position by means of projecting members 11 secured by means of screws or the like 12 to the end walls 2 and 3 of the member 1. The said members 11 are shown as individual members arranged in spaced relation around the periphery of the end walls, but obviously the same may be in the form of continuous flange-like members projecting beyond the circumference of the member 1. The tires 10 preferably are arranged in such spaced relation that the individual tires are loosely contacting the neighbouring tires when the roller is in unloaded condition, but in order to stiffen the construction there may between every two tires, as shown, or between some pairs of tires be arranged a freely rotatable ring member 13, preferably of iron or other suitable material. Each or some of such ring members 13 may, if desired be provided with a circumferential flange forming a cylindrical surface, the purpose of such T-formed rings being also to restrict the radial compression of the tire covers when under load.

When, as shown, the supporting member 1 is in the form of a complete drum, provision may be made of some opening provided with closing means 14 in order that some loading material such as water, sand etc. may be introduced or removed from the interior of the member 1 according to the compacting load required of the roller.

Through the loosely fitting arrangement of the tire covers 10 on the cylindrical supporting surface of the member 1 each and every cover is free to perform a certain radial movement relatively to the surface of the member 1, whereby each and every tire may more leniently yield to some occasional stone, stub, root or like hard object encountered, without any tendency of the roller structure as a whole to tilt, whereby a more perfect and smooth compacting is achieved.

As will be noted the running surface of the roller according to the invention is formed of separate pneumatic tire covers. Thus, the resiliency of the running surface is solely dependent upon the inherent resiliency of the tire cover proper, and not dependent upon any deflation of the tire by means of inner tubes or the like. Consequently, the condition of the tires is irrelevant, even scrap tires unservable for use in deflated condition may well serve the present purpose.

I claim:

1. A road or snow roller comprising a frame structure provided with draw means, a hollow ballast receiving cylindrical supporting drum member rotatably carried in the said frame structure, a plurality of roller elements mounted side by side on the supporting member, each individual element being movable radially on the drum member, the said elements consisting of rimless pneumatic tire covers, with an interior diameter slightly greater than the diameter of the drum member, fitted in parallel relation adjacent each other said elements constituting the sole support for said drum member on a work surface, and means projecting radially from said supporting member on opposite sides of said plurality of elements for engagement with the relatively remote such elements to maintain the axial and vertical positions of such elements.

2. A road or snow roller comprising a frame structure provided with draw means, a hollow ballast receiving cylindrical supporting drum member rotatably carried in the said frame structure, a plurality of roller elements mounted side by side on the supporting member, each individual element being movable radially on the drum member, the said elements consisting of rimless pneumatic tire covers, with an interior diameter slightly greater than the diameter of the drum member, fitted in parallel relation adjacent each other, said elements constituting the sole support for said drum member on a work surface, and a freely rotatable ring member of T-formed section located between at least two neighboring pneumatic tire covers, with inwardly directed stem and with the head of the T spaced inwardly of the outside diameter of said tire covers.

References Cited in the file of this patent

UNITED STATES PATENTS

| | | |
|---|---|---|
| 1,132,118 | Rasmussen | May 16, 1915 |
| 1,190,257 | Henderson | July 4, 1916 |
| 1,570,582 | Thompson | Jan. 19, 1926 |
| 1,831,116 | Huntley | Nov. 10, 1931 |
| 1,998,415 | Booth | Apr. 16, 1935 |
| 2,040,710 | Riehl | May 12, 1936 |
| 2,266,924 | Tway | Dec. 23, 1941 |